US009418172B2

(12) United States Patent
White et al.

(10) Patent No.: US 9,418,172 B2
(45) Date of Patent: Aug. 16, 2016

(54) SYSTEMS AND METHODS FOR REMOTE TRACKING AND REPLAY OF USER INTERACTION WITH A WEBPAGE

(75) Inventors: Alexei R. White, Vancouver (CA); Andre D. Charland, North Vancouver (CA); David C. Johnson, Vancouver (CA); Mitchell Cohen, Ann Arbor, MI (US)

(73) Assignee: FORESEE RESULTS, INC., Ann Arbor, MI (US)

( * ) Notice: Subject to any disclaimer, the term of this patent is extended or adjusted under 35 U.S.C. 154(b) by 1102 days.

(21) Appl. No.: 12/421,695

(22) Filed: Apr. 10, 2009

(65) Prior Publication Data

US 2010/0095208 A1 Apr. 15, 2010

Related U.S. Application Data

(60) Provisional application No. 61/124,392, filed on Apr. 15, 2008.

(51) Int. Cl.
*G06F 17/30* (2006.01)
*H04L 12/26* (2006.01)
*G06F 11/34* (2006.01)
*G06F 3/048* (2013.01)
*H04L 29/08* (2006.01)

(52) U.S. Cl.
CPC ...... *G06F 17/30905* (2013.01); *G06F 11/3438* (2013.01); *H04L 12/2621* (2013.01); *H04L 29/08675* (2013.01); *G06F 3/048* (2013.01); *H04L 67/025* (2013.01)

(58) Field of Classification Search
CPC .......... G06F 17/30905; G06F 11/3438; G06F 2221/03; G06F 3/048; H04L 29/08675; H04L 12/2621; H04L 67/025

USPC .......................................... 715/704; 709/224
See application file for complete search history.

(56) References Cited

U.S. PATENT DOCUMENTS

| | | | |
|---|---|---|---|
| 5,999,908 A | 12/1999 | Abelow | |
| 6,701,350 B1 * | 3/2004 | Mitchell | ................... 709/217 |
| 6,877,007 B1 * | 4/2005 | Hentzel et al. | ............... 709/224 |
| 6,954,783 B1 * | 10/2005 | Bodwell | ........... G06F 17/30896 |
| | | | 707/E17.118 |
| 7,133,834 B1 | 11/2006 | Abelow | |
| 7,222,078 B2 | 5/2007 | Abelow | |
| 7,360,166 B1 * | 4/2008 | Krzanowski | ...... G06F 17/30905 |
| | | | 707/E17.121 |
| 7,370,269 B1 * | 5/2008 | Prabhu et al. | ................. 715/230 |
| 7,620,565 B2 | 11/2009 | Abelow | |

(Continued)

OTHER PUBLICATIONS

Wikipedia—Action Message Format, http://en.wikipedia.org/wiki/Action_Message_Format.*

(Continued)

*Primary Examiner* — Patrick Riegler
(74) *Attorney, Agent, or Firm* — Howard & Howard Attorneys PLLC (57) ABSTRACT

Systems and methods for monitoring user interaction with a remote computer are provided. More specifically, the systems and methods of the present invention allow for the remote tracking and replay of user interaction with a remote computer or webpage. One aspect of the invention allows user interaction data to be replayed on an embedded browser on a replay server. The replayed user interaction data may be converted to a video file to facilitate playback of the interaction data substantially independent of the replay server.

24 Claims, 7 Drawing Sheets

(56) References Cited

U.S. PATENT DOCUMENTS

| | | | |
|---|---|---|---|
| 7,765,295 B2* | 7/2010 | Anastas et al. | 709/224 |
| 7,941,525 B1* | 5/2011 | Yavilevich | 709/224 |
| 8,225,195 B1* | 7/2012 | Bryar | G06F 17/30905 715/200 |
| 2001/0034638 A1 | 10/2001 | Kelley et al. | |
| 2002/0038388 A1* | 3/2002 | Netter | 709/318 |
| 2002/0083025 A1* | 6/2002 | Robarts et al. | 706/12 |
| 2002/0083145 A1 | 6/2002 | Perinpanathan | |
| 2003/0046385 A1* | 3/2003 | Vincent | 709/224 |
| 2003/0053420 A1* | 3/2003 | Duckett et al. | 370/252 |
| 2004/0054715 A1* | 3/2004 | Cesario | 709/203 |
| 2004/0103371 A1* | 5/2004 | Chen | G06F 17/30905 715/205 |
| 2004/0107423 A1* | 6/2004 | Noda | G06F 17/3089 719/311 |
| 2004/0119682 A1* | 6/2004 | Levine et al. | 345/156 |
| 2004/0122943 A1* | 6/2004 | Error et al. | 709/224 |
| 2004/0128534 A1* | 7/2004 | Walker | 713/200 |
| 2004/0261026 A1* | 12/2004 | Corson | 715/704 |
| 2005/0060655 A1* | 3/2005 | Gray et al. | 715/745 |
| 2005/0188423 A1* | 8/2005 | Motsinger | H04L 63/0876 726/22 |
| 2006/0004680 A1* | 1/2006 | Robarts et al. | 706/12 |
| 2006/0123340 A1 | 6/2006 | Bailey | |
| 2006/0276997 A1* | 12/2006 | Drees | 702/182 |
| 2007/0106692 A1* | 5/2007 | Klein | 707/104.1 |
| 2007/0250618 A1* | 10/2007 | Hammond | 709/224 |
| 2008/0040473 A1 | 2/2008 | Larsson | |
| 2008/0052392 A1* | 2/2008 | Webster et al. | 709/224 |
| 2008/0077671 A1* | 3/2008 | Rust | 709/205 |
| 2008/0120548 A1* | 5/2008 | Morita et al. | 715/717 |
| 2008/0126931 A1* | 5/2008 | Kojima et al. | 715/704 |
| 2008/0172488 A1* | 7/2008 | Jawahar | G06F 17/30902 709/225 |
| 2008/0222653 A1* | 9/2008 | Aaronson | 719/318 |
| 2009/0063968 A1* | 3/2009 | Wenig et al. | 715/704 |
| 2009/0083646 A1* | 3/2009 | Lin | G06F 17/30905 715/769 |
| 2009/0094377 A1* | 4/2009 | Zahavi | G06F 17/30905 709/232 |
| 2010/0299434 A1* | 11/2010 | Hanson et al. | 709/224 |

OTHER PUBLICATIONS

Wikipedia—XMLHttpRequest, http://en.wikipedia.org/wiki/XMLHttpRequest.*

W3C, "XMLHttpRequest Level 2", Feb. 25, 2008, http://www.w3.org/TR/2008/WD-XMLHttpRequest2-20080225/.*

PCT International Preliminary Report on Patentability (IPER) issued in PCT Patent Application No. PCT/US2009/040194, dated Oct. 19, 2010.

PCT Search Report issued in PCT Patent Application No. PCT/US2009/040194, dated Aug. 11, 2009.

* cited by examiner

SYSTEMS AND METHODS FOR REMOTE TRACKING AND REPLAY OF USER INTERACTION WITH A WEBPAGE

PRIORITY CLAIM

This application claims priority pursuant to 35 U.S.C. §119 to U.S. Provisional Application Ser. No. 61/124,392 filed Apr. 15, 2008.

BACKGROUND OF THE INVENTION

The present inventions relate generally to systems and methods for monitoring user interaction with a remote computer. More specifically, the present inventions relate to systems and methods for the remote tracking and replay of user interaction with a remote computer or webpage.

It is desirable for companies conducting business online, such as by operating business related webpages over the Internet, to be able to observe and/or collect and analyze the interaction of certain users with their webpages. Commercial software for collecting and analyzing summary aspects of user interaction with webpages is known in the art. However, such known tools typically do not permit the collection or analysis of details of individual user interactions with a webpage, such as how an individual user completes a form on a webpage, or which parts of a webpage a user interacts with the most easily, or how a user navigates from one element of a webpage to another, for example.

Other software for remotely collecting and analyzing certain other details of individual user interactions with a webpage is known in the art. However, such known software typically requires that the host or service provider collect user interaction details and also provide the webpage to the user's computer. Such configurations increase the processing overhead on the webpage server and limits the ability of a third party service provider, such as a user interaction analysis service provider, from being able to collect user interaction data from the host server.

As a result of such limitations, it would be desirable to provide systems and methods that provide remote tracking and replay of user interaction with a webpage that allows for hosting and serving the webpage by one service provider, and collection and replay of user interaction with the webpage provided by a separate service provider, using computers separate from the service hosting and serving the webpage to the user.

SUMMARY OF THE INVENTION

It is an object of the present invention to provide systems and methods for remote tracking of user interaction with a webpage that addresses some of the limitations of the prior art.

Another object of the present invention is to provide systems and methods for remote replay of user interaction with a webpage that addresses some of the limitations of the prior art.

It is a further object of the invention to provide a computer readable medium and computer implemented method of remotely tracking and replaying user interaction with a webpage that provides for cross-domain transmission of user interaction data to a tracking computer separate from a host computer that hosts the webpage Yet a further object of the invention is to provide a computer readable medium and computer implemented method of remotely tracking user interaction with a webpage or other multimedia resource that provides for real-time cross-domain transmission of user interaction data to a tracking computer, and real-time replay of user interaction data on one or more other computers in a collaborative environment.

According to an embodiment of the invention, a computer readable medium is provided, comprising executable instructions to request a webpage from a web server, request a tracking script from a tracking server, receive the webpage and tracking script and execute the tracking script, to capture, process and store user interaction data during browsing of the webpage, and to periodically transmit the user interaction data by means of dynamic script request or commonly available compression and transmission techniques, and to store the user interaction data on a tracking or replay server.

According to another embodiment, a computer readable medium is provided, comprising executable instructions to identify elements of a webpage, define listeners for each element, record user interaction with the webpage as user interaction data using the listeners, to process and store the data in a web browser storage, to packetize the data and encode the packetized data as a dynamic script request, and to transmit the dynamic script request to a tracking server.

According to a further embodiment of the invention, a computer implemented method for replaying a user's interaction with a webpage is provided, comprising requesting playback of a tracking record from a tracking server, requesting the webpage from a web server, receiving the webpage and requesting a tracking script from the tracking server, receiving and executing the tracking script, periodically requesting and receiving user interaction data from the tracking server by means of a dynamic script request, recreating an interaction visualization from the user interaction data, and playing back the interaction visualization on the webpage.

According to a further embodiment of the invention, a computer implemented method for replaying a user's interaction with a webpage is provided, comprising requesting playback of a video file from a replay or tracking server, and constructing the video file by requesting a replay script from the server, receiving and executing the replay script, periodically requesting and receiving user interaction data from the tracking or replay server through commonly available data compression and transmission applications, recreating an interaction visualization, such as movie from the user interaction data, and playing back the interaction visualization using commonly available video playback applications such as Windows Media Player or QuickTime.

Further advantages of the invention will become apparent when considering the drawings in conjunction with the detailed description.

BRIEF DESCRIPTION OF THE DRAWINGS

The system and method of the present invention will now be described with reference to the accompanying drawing figures, in which.

Like reference numerals refer to corresponding parts throughout the several views of the drawings.

DETAILED DESCRIPTION OF THE INVENTION

Figure 1:
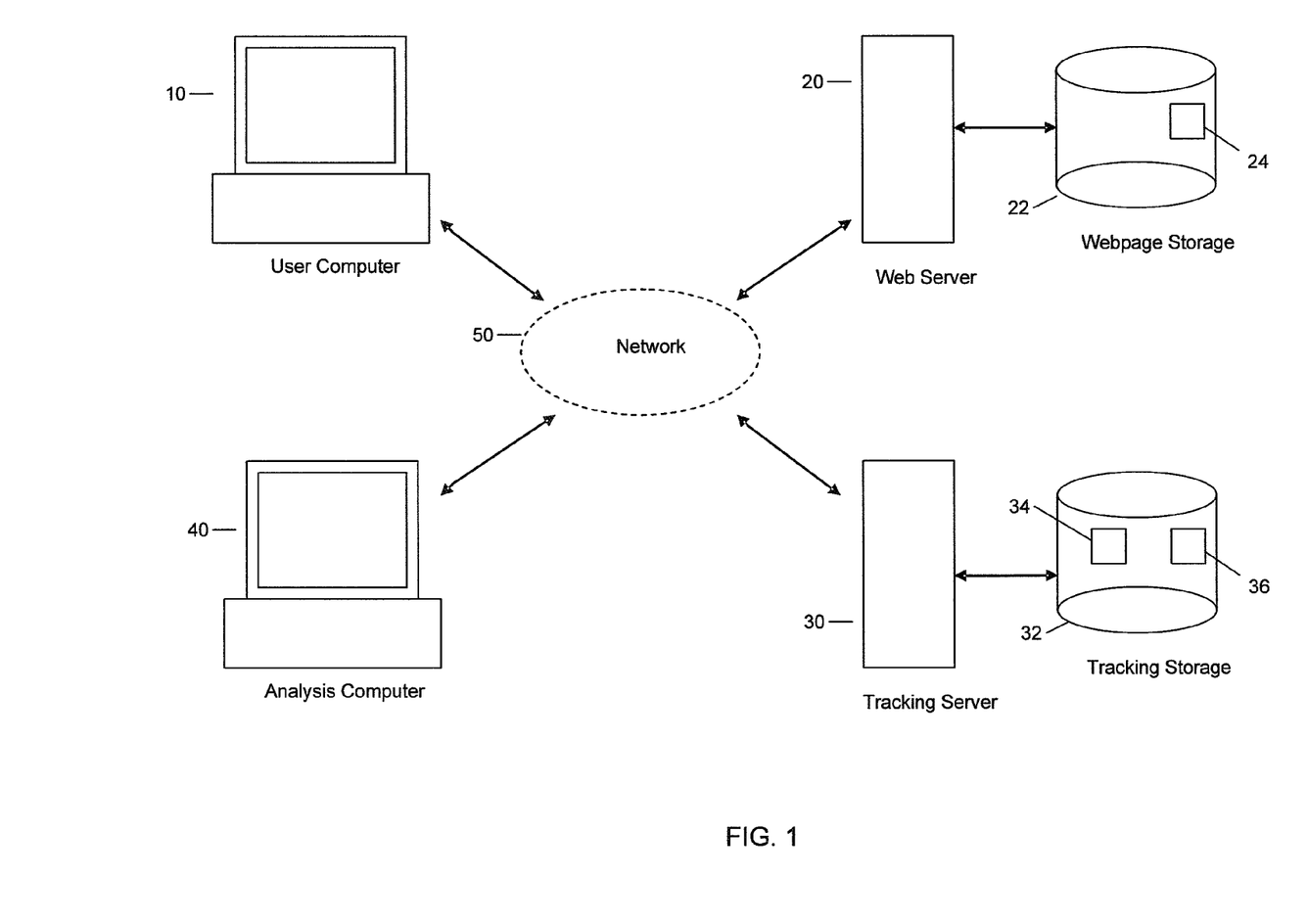
FIG. 1 illustrates an exemplary networked operating environment for implementing an embodiment of the present invention.

FIG. 1 illustrates an exemplary networked operating environment in which embodiments of the present invention may be implemented. The networked environment includes a user computer 10 connected to a communication network 50, which may include, for example, one or more of: a local area network (LAN), wide area network (WAN), world wide web (WWW), the Internet, such that user computer 10 may communicate with other computers similarly connected to network 50. Other computers connected to network 50 may include a web server 20, tracking server 30, and an analysis computer 40, which may each communicate with any other computer connected to network 50. User computer 10 includes standard computing components known in the art for transmitting and receiving data to and from other computers connected to the user computer 10 through network 50.

Similarly, web server 20 includes standard computing components known in the art for serving web pages to other computers over the network 50. In particular, web server 20 is connected to a webpage storage repository 22 which stores one or more webpage resources 24. Webpage storage repository 22 may include a conventional data storage device such as a hard disk or solid-state memory located with and connected directly to web server 20, or may include a remote data storage facility connected to web server 20. Webpage 24 may include a single document, such as a hypertext document commonly written in a markup language such as HTML or XML, or may include multiple documents such as a multi-page website, which may be accessed by a user computer 10 connected to the web server 20 through network 50. Webpage 24 may also include one or more scripts or commands for executing operations expressed in one or more known scripting languages such as JavaScript for example. Such scripts may be included in the webpage 24 when it is served to other computers by web server 20.

Tracking server 30 includes standard computing components known in the art for sending and receiving data to and from other computers connected to network 50. In particular, tracking server 30 is connected to a tracking storage repository 32. Tracking storage repository 32 may comprise a conventional data storage device such as a hard disk or solid-state memory located with and connected directly to tracking server 30, or may comprise a remote data storage facility connected to tracking server 30, such as a database.

Tracking storage repository 32 stores a tracking script 34 which may be expressed in a known scripting or command language such as JavaScript for example, and may include computer executable instructions to record and transmit interaction data related to the interaction of a user with a webpage, as described in greater detail below in reference to FIGS. 2-6. In some embodiments, the script may include a function call to one or more applications that may be used to communicate interaction data across network 50. For example, one or more commonly found applications, such as Adobe Flash, may be used to compress and transmit data (e.g., in action message format ("AMF" format)).

Tracking storage repository 32 may also store one or more tracking records 36 including such interaction data, which may be received from or transmitted to one or more computers connected to tracking server 30 through network 50, such as a user computer 10 or an analysis computer 40, for example.

It will be appreciated from the above that tracking server 30 and tracking storage 32 may be constructed in many forms (not shown). For example, these resources may be constructed from multiple, physically remote, stand alone platforms, with functions that may be distributed across such resources or may be integrated into one or more "single platforms" configured to perform the various different required functions as further described herein (e.g., through a partition or logical assignment).

Moreover, it will be further understood that server 30 and storage 32 may perform a variety of roles. For example, server 30 and storage 32 may receive tracking information regarding a user's interaction with a webpage as further described herein. However, server 30 and storage 32 may also perform certain other functions such as the replay of interaction data stored in storage 30 in response to a request for playback.

For example, a system analyst may desire to view user interactions at analysis computer 40 based on tracking data stored in storage 32. In this case, tracking server 30 may act as a "replay server" and fetch the tracking records from storage 32 and replay them for viewing on analysis computer 40. Thus, tracking server 30 and tracking storage 32 may be sometimes by referred to herein as "replay server" 30 or "replay storage" 32 depending on the role they perform.

Furthermore, it will be understood that server 30 and storage 32 may play dual roles, performing both replay and tracking functions as needed. However, others may operate as substantially dedicated servers performing either replay or tracking functions (not shown).

Similar to user computer 10, analysis computer 40 may includes standard computing components for transmitting and receiving data to and from other computers connected to the analysis computer 40 through network 50.

Figure 2:
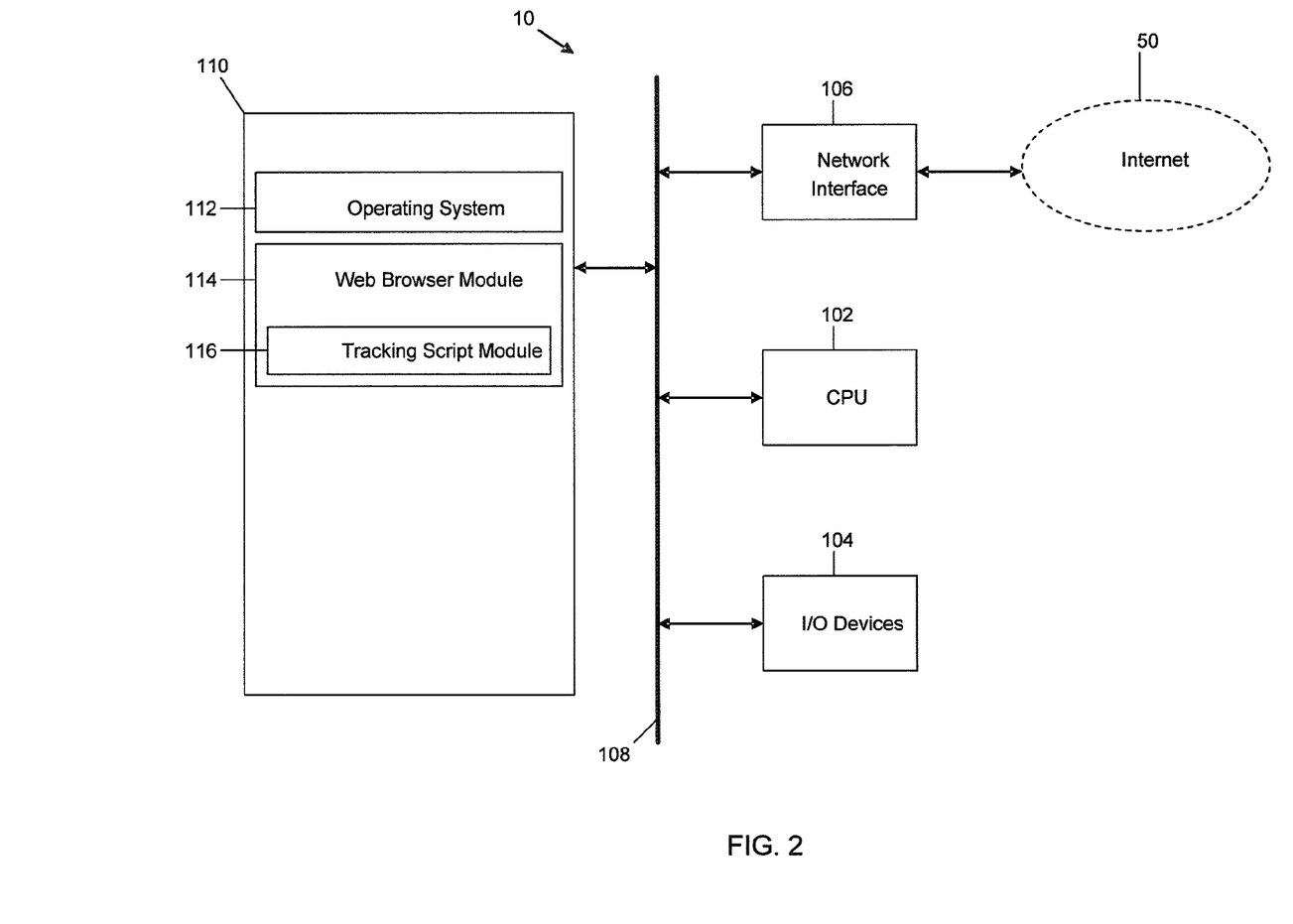
FIG. 2 illustrates an exemplary user computer architecture configured according to an embodiment of the invention.

FIG. 2 illustrates an exemplary computer architecture for a user computer 10 configured in accordance with an embodiment of the invention. According to an embodiment of the invention, analysis computer 40 as described above may also be configured similarly to the exemplary architecture of user computer 10 as illustrated in FIG. 2. Computer 10 may include standard components, including a central processing unit 102 and input/output devices 104, which are linked by a bus 108. Input/output devices 104 may comprise a keyboard, mouse, touch screen, monitor, printer, and the like, for example. A network interface 106 is also connected to the bus 108. Network interface 106 provides connectivity to a network 50, such as the exemplary network 50 described above, thereby allowing the computer 100 to operate in a networked environment. Also connected to bus 108 is a computer-readable memory 110. Memory 110 stores executable instructions to implement some or all of the functions of the invention. Computer-readable memory 110 may comprise any available computer-readable media or device that can be accessed by computer 100.

In an embodiment of the invention, one or more of the following program modules and data files may be stored in the memory 110 of the computer 10: an operating system module 112, a Web browser module 114 and a tracking script module 116.

Operating system module 112 may be suitable for controlling the operation of a networked user or analysis computer, and in particular may include instructions for handling various system services, such as file services or for performing hardware dependant tasks. Operating system module 112 may also comprise instructions for standard computer operation, including receiving input from input devices such as a keyboard or mouse, and for displaying output in a graphical format on a monitor, for example.

Web browser module 114 may include instructions for browsing webpages provided by a web server or other source, such as instructions for requesting and receiving a webpage from a web server and displaying the webpage on a display device such as a monitor. Web browser module 114 also include instructions for receiving input from a user's interaction with a webpage such as from input devices like a keyboard and mouse for example, and for transmitting such user input to a web server. Web browser module 114 may also comprise instructions for executing processing commands comprised in webpages or other files such as scripts.

Tracking script module 116 may include instructions for recording interaction data input by a user in the process of interacting with a webpage, such as mouse movements, scrolling, clicks and keyboard entries, for example. In an embodiment of the invention, tracking script module 116 may also include instructions for processing such interaction data, and for transmitting processed interaction data to a remote tracking server 30, such as over network 50.

In some embodiments, tracking script module 116 may include instructions for receiving interaction data from a remote replay server 30, and for recreating and displaying an interaction visualization from the received interaction data (e.g., using certain known multimedia applications such as Web Browser, Windows Media Player, QuickTime, Adobe Flash, etc.). Such exemplary instructions associated with tracking script module 116 are described in further detail below with reference to FIGS. 5-7.

The above described program modules incorporate instructions to implement processing operations associated with the invention. Various embodiments of the processing operations of the above-described program modules are described below with reference to FIGS. 5-7. The modules stored in memory 110 are exemplary, and additional modules can be included. It should be appreciated that the functions of the presented modules may be combined. In addition, a function of a module need not be performed on a single machine; instead, the function may be distributed across a network to one or more other computers if desired, for example. It is the functions of the invention that are significant, not where they are performed or the specific manner in which they are performed.

Figure 3:
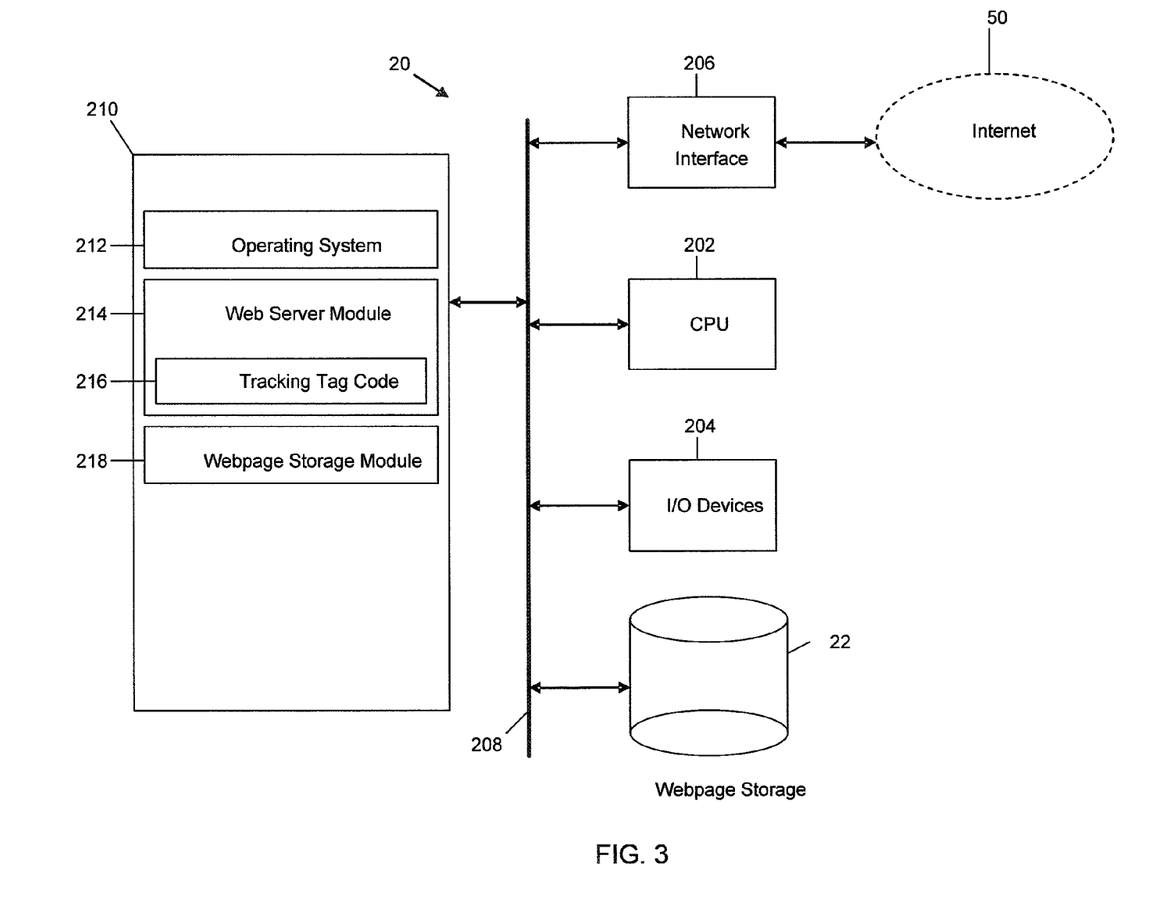
FIG. 3 illustrates an exemplary web server computer architecture configured according to an embodiment of the invention.

FIG. 3 illustrates an exemplary computer architecture for a web server computer 20, such as illustrated in the computer system of FIG. 1, configured in accordance with an embodiment of the invention. Computer 20 may include standard components known in the art, including a central processing unit 202 and input/output devices 204, which are linked by a bus 208. Input/output devices 204 may comprise a keyboard, mouse, touch screen, monitor, printer, and the like, for example. A network interface 206 is also connected to the bus 208. Network interface 206 provides connectivity to a network 50, such as the exemplary network 50 described above, thereby allowing computer 20 to operate in a networked environment. Web server 20 also comprises a webpage storage repository 22 capable of storing one or more webpage resources. Webpage storage repository 22 may comprise a conventional data storage device such as a hard disk or solid-state memory located with and connected to web server 20 such as by bus 208 as shown in FIG. 3, or may alternately comprise a remote data storage facility accessibly connected to web server 20. Also connected to bus 208 is a computer-readable memory 210. Memory 210 stores executable instructions to implement functions of the invention. Computer-readable memory 210 may comprise any available computer-readable media or device that can be accessed by the computer 20.

In an embodiment of the invention, one or more of the following program modules and data files may be stored in memory 210 of the web server computer 20: an operating system module 212, a web server module 214, a tracking tag code module 216 and a webpage storage module 218. Other applications such as a multimedia player, a flash player or compression and transmission application may be included in operating system 212 or web server module 214 or installed as stand alone modules, if desired (not shown).

Similar to module 112 described above, operating system module 212 may include instructions for handling various system services for web server computer 20, such as file services or for performing hardware dependant tasks. Operating system module 212 may also include instructions for standard computer operation, including receiving input from input devices such as a keyboard or mouse, and for displaying output in a graphical format on a monitor, for example.

Web server module 214 includes instructions for serving webpages requested by another computer, such as instructions for receiving a request for a webpage from a user computer, accessing the webpage, and serving the webpage to the requesting user computer, for example. Web server module 214 may also include instructions for receiving input from a user's interaction with a webpage, processing such input, and serving additional webpage content to a user computer in response.

In one embodiment, tracking tag code module 216 may be stored as a sub-module of web server module 214, and includes instructions for requesting a tracking script from a tracking server 30. The tracking tag code module may also include further instructions to add or attach instructions for requesting a tracking script from tracking server 30 to one or more webpages before they are served to user computers.

Webpage storage module 218 includes instructions for accessing webpage storage repository 22, such as for accessing and retrieving stored webpages and/or other stored resources, in response to requests for such webpages and/or resources from user computers, for example.

Figure 4:
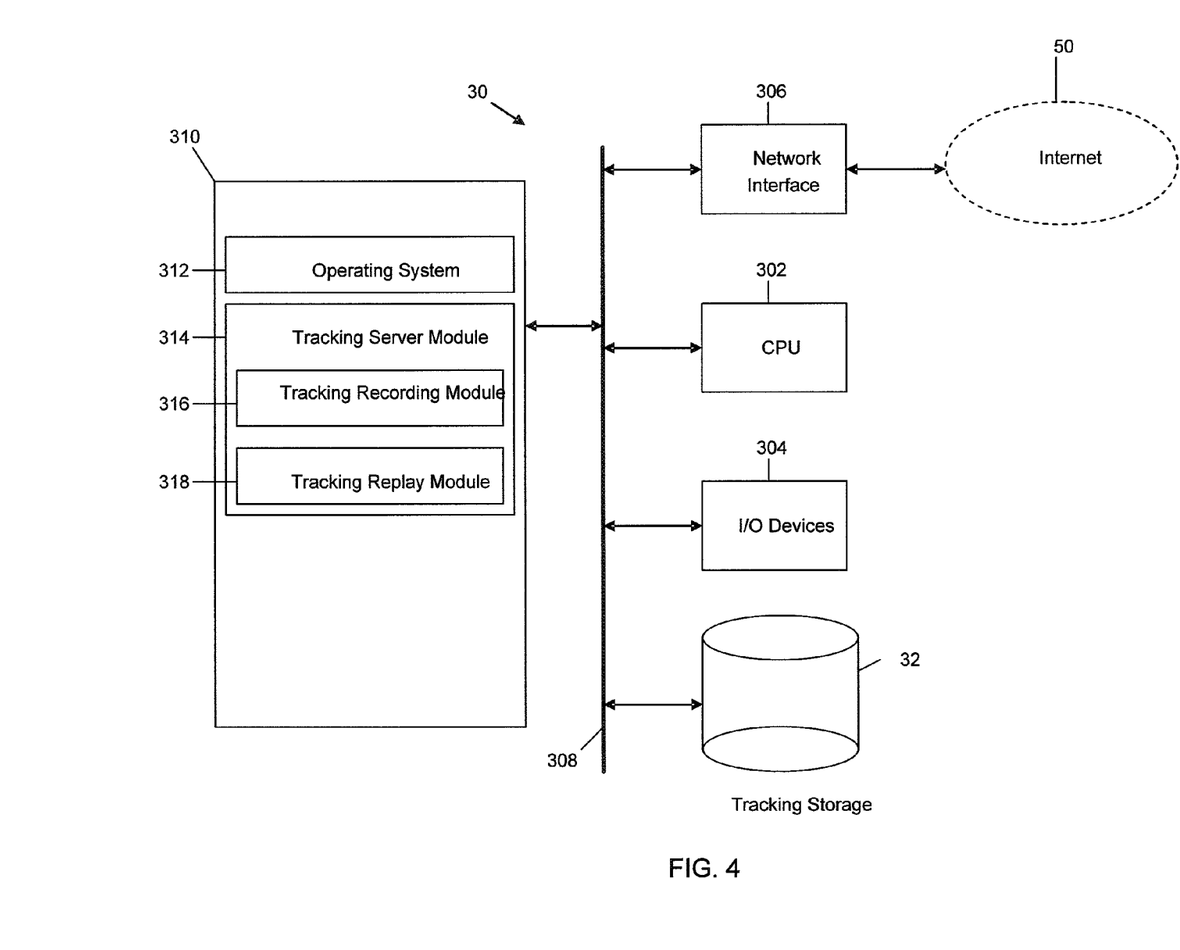
FIG. 4 illustrates an exemplary tracking server computer architecture configured according to an embodiment of the invention.

FIG. 4 illustrates an exemplary computer architecture for a tracking server computer 30, such as illustrated in the computer system of FIG. 1, configured in accordance with an embodiment of the invention. Computer 30 may include standard components known in the art, including a central processing unit 302 and input/output devices 304, which are linked by a bus 308. The input/output devices 304 may include a keyboard, mouse, touch screen, monitor, printer, and the like, for example. A network interface 306 is also connected to the bus 308. The network interface 306 provides connectivity to a network 50, such as the exemplary network 50 described above, thereby allowing the computer 30 to operate in a networked environment. Tracking server 30 also comprises a tracking storage repository 32 capable of storing one or more tracking scripts and/or tracking record resources, for example. Tracking storage repository 32 may include one or more conventional data storage devices such as a hard disk, solid-state or optical memory located with and connected directly to web server 30 such as by bus 308 as shown in FIG. 4, or may alternately include a remote data storage facility accessibly connected to web server 30. Also connected to bus 308 is a computer-readable memory 310. Memory 310 stores executable instructions to implement functions of the invention. Computer-readable memory 310 may include any available computer-readable media or device that can be accessed by computer 30.

In an embodiment of the invention, one or more of the following program modules and data files may be stored in memory 310 of the tracking server computer 30: an operating system module 312, a tracking server module 314, a tracking recording module 316, and a tracking replay module 318.

Similar to module 112 described above, operating system module 312 may include instructions for handling various system services for tracking server 30, such as file services or for performing certain hardware or application dependant tasks. Operating system module 312 may also include instructions for standard computer operation, including receiving input from input devices such as a keyboard or mouse, and for displaying output in a graphical format on a monitor, for example.

Tracking server module 314 includes instructions for receiving a request for a tracking script from a user computer, accessing the tracking script, and transmitting a tracking script to the user computer. In one embodiment, the tracking script or other suitable tracking code may be stored in tracking storage repository 32. Furthermore, tracking server module 314 includes instructions for accessing tracking storage repository 32 to retrieve the tracking script or other suitable tracking code.

As shown in FIG. 4, tracking server module 314 may further include tracking server module 316 as a sub-module or embedded application. Tracking recording module 316 includes instructions to receive user interaction data transmitted by a user computer, and to record such data as one or more tracking records or data structures. In one embodiment, such tracking records may be stored in tracking storage repository 32, for example. In other embodiments, tracking recording module 316 may also include instructions for analyzing user interaction data received from a user computer.

Tracking server module 314 may also further include a tracking replay module 318 as a sub-module or embedded application. Tracking replay module 318 includes instructions for receiving a request for replay of one or more tracking records from an analysis computer, accessing the one or more tracking records, such as from tracking storage repository 32, and for transmitting recorded user interaction data to analysis computer 40. In one embodiment, tracking replay module 318 may further include instructions to process and/or transform user interaction data retrieved from one or more tracking records, prior to transmitting the data to the an analysis computer.

For example, in some embodiments, tracking replay module 318 may include code or routines that facilitate the playback of captured interaction data. It may also include the ability to create video or "movies" from interaction data. For example, such interaction data may be combined, modified, extrapolated or otherwise "stitched together" as is known in the art to generate a video representation of the user's webpage interaction. Such video may be subsequently replayed using known commonly available video players such as Windows Media Player or QuickTime on a user's computer.

Tracking replay module 318 may further include code or routines that improve the quality or comprehensiveness of the replay experience. For example, data captured by recording module 316 may be in varying formats and/or may be captured with limited metadata or background information. This may limit the quality and/or ability to consistently or accurately replay user session data. Tracking replay module 318 may include routines that normalize the different data formats received by module 316 to permit accurate or consistent replay and may further include certain "proxy" routines to collect information to further facilitate and improve the playback experience.

Such normalization functions may include, but are not limited to: rewriting image URL's to point to the correct location of an image; document write calls are removed or masked; AJAX requests are rewritten to use custom AJAX class requests rather than native browser HTTP requests; JavaScript errors known to cause errors are rewritten using heuristics; known third party components such as JQuery are supplanted with customized versions that function better in the replay environment, etc.

Proxy routines may retrieve certain information such as environment, content, background, driver or other related webpage information such as a document object model "DOM" (the "additional features" information) not related to user interaction. This information may not have been captured along with the user interaction due to the size of the information, based on the relatively static nature of the information, due the information already existing in tracking storage 32, due to the specific coding of the tracking script, or based on other factors.

In operation, such proxy routines may seek this additional features information from various sources such as the Internet or other network locations to facilitate replay of user interaction data. This may be referred to as a "remote proxy." In some embodiments, such additional features data may be automatically obtained after associated user interaction data is transmitted to tracking storage 32. In other embodiments, such additional features data may be obtained when playback of that user interaction data is requested (or somewhat before, based on expected replay to prevent excessive system latency).

In some embodiments, the additional features data may have been captured at the time the user interaction data was captured. In this case, this information may be retrieved from tracking storage 32 when replay is requested. This may be referred to as a "local proxy." In other embodiments, some additional features information may be captured with user interaction data, while others are not. In this case, proxy routines in tracking replay module 318 may first poll storage 32 for the additional features data. If it is not present in storage 32, the information may be automatically sought as described above (i.e., start with a local proxy and expand to remote proxy, if necessary (or desired)).

Figure 5:
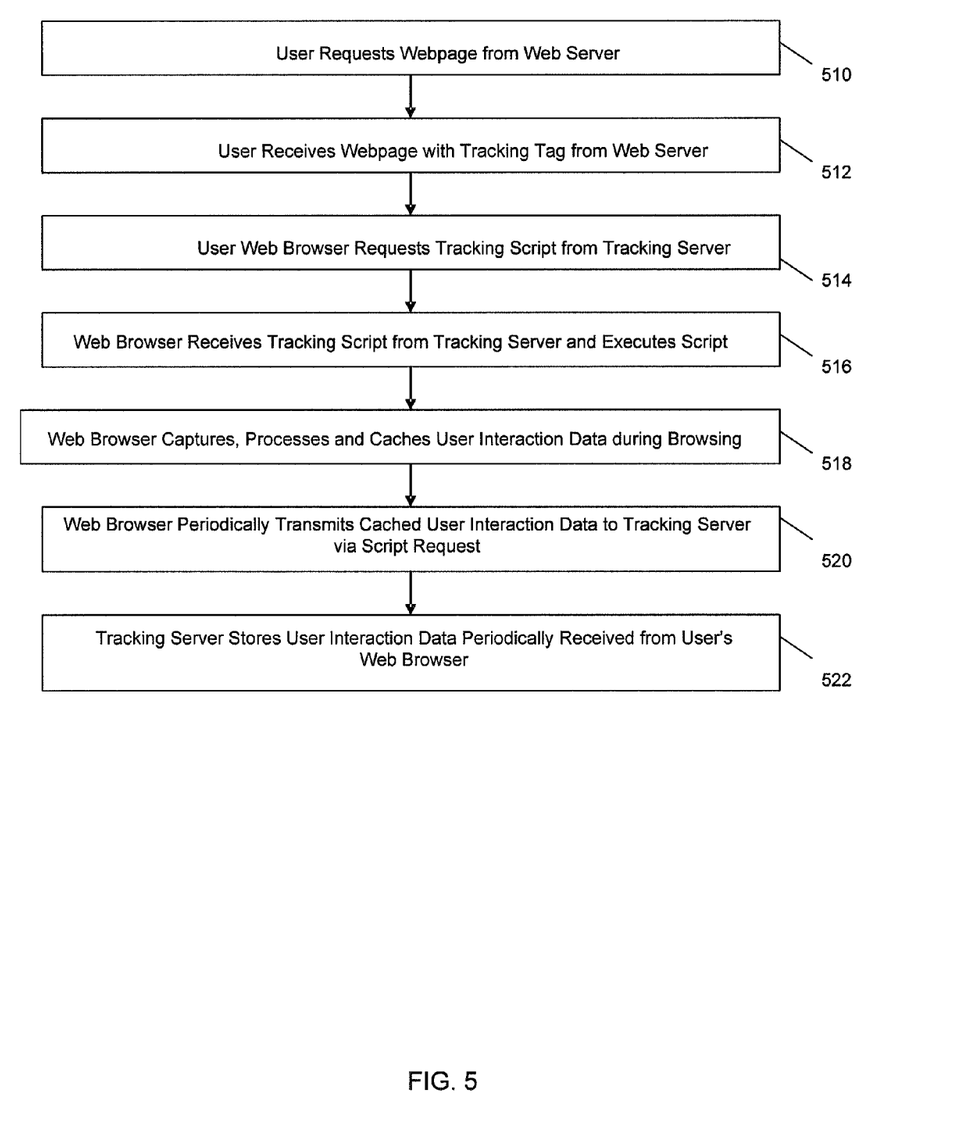
FIG. 5 illustrates a series of processing operations associated with an embodiment of the invention.

FIG. 5 illustrates a series of processing operations that may be implemented by the system illustrated in FIG. 1, and the exemplary computers illustrated in FIGS. 2-4, according to an embodiment of the invention. In the first processing operation 510 of FIG. 5, a user requests a webpage 24 from a web server 20. In an embodiment of the invention, the user requests the webpage 24 using a web browser application, executing on a user computer 10, such as web browser module 114 on computer 10, which communicates the request for webpage 24 to the web server 20 by means of network 50, according to known methods. In one embodiment, web server 20 stores a tracking tag code 216 which may be incorporated in the markup code of webpage 24 as stored in webpage storage repository 22, or alternatively may be stored elsewhere and is accessible to web server 20. Tracking tag code 216 includes executable instructions for a web browser, such as user web browser module 114, to request a file from tracking server 30.

In such an embodiment, when web server 20 receives the request for webpage 24 from web browser module 114 on user computer 10, tracking tag code 216 may be incorporated in webpage 24 before it is sent to user computer 10. In a particular embodiment, tracking tag code 216 may comprise a <script src=" . . . "> tag which includes executable instructions for a web browser to request a script file from a particular source location, such as a JavaScript file from a particular Uniform Resource Locator (URL) or Internet Protocol (IP) address. However, any other suitable script or command structure may be used, if desired.

In another embodiment, the scripting tag may not be static included in webpage 24, but rather may be dynamically included by a user through a web browser plug in or proxy technique, using a tool such as Fiddler. In this case, the webpage interaction data may be recorded and replayed as further described herein. However, one benefit of this approach is the added ability to perform remote usability studies whereby certain web users may be selected to interact with specific websites to acquire interaction data related to specific website functions. This allows third parties to determine or otherwise assess the usability and functionality of given website of interest.

In the second processing operation 512 of FIG. 5, the user receives webpage 24 with tracking tag code 216 from web server 20. Processing operation 512 may be implemented using user web browser module 114 on user computer 10 to receive webpage 24 which may be served using web server module 214. Webpage 24 may be transmitted between web server 20 and user computer 10 by means of network 50, according to known methods.

Next, at processing step 514, the user web browser requests tracking script 34 from tracking server 30. Processing operation 514 may be implemented using user web browser module 114 on user computer 10, which communicates the request for tracking script 34 from user computer 10 to tracking server 30, according to known methods. In one embodiment, tracking tag code 216 incorporated in webpage 24 as received from web server 20 includes instructions executable by web browser module 114 to request tracking script 34 from tracking server 30.

In a preferred embodiment, the request for tracking script 34 from tracking server 30 according to operation 514 is made automatically by the user's web browser, such as web browser module 114, and is substantially transparent to the human user of user computer 10. In an alternative embodiment, tracking script 34 may be stored separate from tracking server 30, such as on another computer or storage repository which may be accessed by tracking server 30 upon receiving the request for tracking script 34 from user computer 10. According to a further alternative embodiment, tracking script 34 may be stored on a separate computer, and web server 20 may request and receive tracking script 34 from the separate computer in place of tracking server 30.

In the next processing operation 516 of FIG. 5, the user web browser receives tracking script 34 from tracking server 30, and executes tracking script 34. Processing operation 516 may be implemented using web browser module 114 executing on user computer 10, which may receive tracking script 34 from tracking server 30 by means of network 50, according to known methods. Preferably, executable instructions in tracking script 34 as received by the web browser on user computer 10 may be executed by any standard web browser application running on the user computer 10, such as represented by web browser module 114. Exemplary standard web browser applications may include Internet Explorer® from Microsoft Corporation of Redmond, Wash., Firefox® from Mozilla Corporation of Mountain View, Calif., Safari™ from Apple Inc. of Cupertino, Calif., and Opera™ from Opera Software of San Diego, Calif., for example. In one embodiment, the executable instructions included in tracking script 34 may be implemented by a sub-module, such as tracking script module 116, executing within web browser module 114.

In one embodiment, upon receiving tracking script 34, web browser module 114 may add tracking script 34 to the webpage 24 by appending the executable instructions or other code in tracking script 34 at the top of the markup language code of webpage 24. Tracking script 34 may also be appended to webpage 24 by attaching it to webpage 24 or by referencing the tracking script file 34 in the markup language code of webpage 24, and then execute the tracking script together with webpage 24. In alternate embodiments, tracking script 34 may be stored separately from webpage 24 by web browser module 114, and may be executed by web browser module 114, or tracking script sub-module 116 separately from the execution (or display) of webpage 24, although such separate execution may take place simultaneously.

According to a further embodiment of the invention, tracking script 34 includes executable instructions which may be executed by a web browser application for capturing and processing user interaction data generated by user interaction with a webpage, and for transmitting such user interaction data to tracking server 30. Details of processing operations associated with such executable instructions according to one embodiment are described below with reference to FIG. 6.

Exemplary user interaction data which may be captured, processed and transmitted according to the instructions in tracking script 34 may include, but are not limited to: a user's movements and selections (such as mouse-clicks) of a pointing device such as a mouse or touchpad, scrolling, entry of text in or selection of menus, buttons, checkboxes, password fields, tables or SELECT fields, data related to the completion of forms or query boxes including initial values of form or text fields, which may include pixel coordinates of such form fields, and navigation (such as scrolling or clicking of links) while a user interacts with a webpage 24, for example. Additionally, one or more of: the network address, location, URL or identity of the host of the webpage 24 the user is browsing, the type and version of web browser application and operating system software the user is using, and the dimensions of the user's web browser viewing window, may also be incorporated in the user interaction data that is captured, processed and transmitted.

According to an additional embodiment, user interactions with dynamic elements which may be included in webpage 24, such as interactions with rich AJAX (involving DHTML and JavaScript) elements, Adobe Flash™ elements, or other dynamic elements which may be part of webpage 24 may also be captured as user interaction data. Such data may qualify as the additional features data described above in connection with FIG. 4.

In an alternative embodiment of the invention directed to tracking a user's interaction with video or dynamic multimedia applications, such as Adobe Flash™ and Adobe Flex™ applications or movies, processing operation 510 may include a user request for a Flash™ or Flex™ application or website comprising such an application from a web server 20. Following such user request, the user may receive a Flash™ or Flex™ application or movie (such as in the form of a .swf file) from web server 20 which includes a tracking code portion, analogous to tracking script 34 referenced in processing operations 512 and 514. Such tracking code portion of the Flash™ or Flex™ application of movie received by the user computer includes instructions for tracking a user's interaction with the application or movie, such as described above in reference to tracking script 34, which may be executed by the user's web browser, or an ancillary application, such as a Flash™ plug-in application on the user's computer, for example.

In the next processing operation 518 of FIG. 5, the web browser captures, processes and stores user interaction data during browsing of a webpage 24. Processing operation 518 may be implemented using web browser module 114 on user computer 10, which may execute instructions in tracking script 34 to capture, process and store various types of user interaction data, such as the exemplary types of user interaction data described above, generated while the user browses and interacts with webpage 24. The capture, processing and storing of user interaction data generated while a user browses website 24 may be accomplished by any suitable method such as those well known in the art.

In a preferred embodiment, the instructions in tracking script 34 for capturing, processing and storing user interaction data during a user's browsing of webpage 24 may be executed by a standard web browser application, and optimized for using standard features and instruction sets commonly or universally supported by industry standard web browser applications. Further, processed user interaction data may be stored in the cache memory of the web browser application, such as in the web browser module 114 of user computer 10. In an exemplary embodiment, tracking script 34 may comprise instructions using JavaScript which are executed by web browser module 114 to capture, process and cache user interaction data while the user browses webpage 24.

In some embodiments, the capture process may involve capturing enough data to recreate the website as actually seen by the user. For example, if there was a special advertisement, promotion, pop-up or other banner present on the site it may be desired to capture that information to fully recreate it. One way this may be accomplished is by capturing a document object model (DOM) describing the webpage itself. The DOM may be serialized (e.g., converted into a text string) and subsequently transmitted as described below in connection with step 520. In some embodiments, to avoid transmitting the entire webpage repeatedly, the DOM may be compressed using a hashing algorithm or represented by a shorter data structure (e.g., a 32 bit data structure) and compared against other known DOMs that have previously been saved. In the case where the DOM has been previously saved, it is unnecessary to transmit it again, and pointer to the previously saved version may be used instead.

In an alternative embodiment of the invention directed to tracking a user's interaction with dynamic multimedia applications, such as Adobe Flash™ and Adobe Flex™ applications or movies, processing operation 518 may comprise the user's web browser or ancillary application (such as a Flash™ plug-in application) capturing, and processing user interaction data during the user's interaction with a Flash™ or Flex™ application or movie, for example.

At processing operation 520, the user's web browser periodically transmits cached user interaction data to tracking server 30 via a script request. Processing operation 520 may be implemented using web browser module 114 on user computer 10, which may periodically transmit cached user interaction data over network 50 to tracking server 30 by means of a script request.

Such a transmission request may be initiated by the browser based on predefined criteria or may be triggered by certain behavior of the user. For example, if the number of navigation maneuvers with a certain webpage exceeds a certain threshold, or if the number of webpages visited exceeds a certain number, the user data may be transmitted and saved.

In some embodiments where a triggering event occurs, the user's browser may be instructed to save the interaction data rather than immediately transmitting the data, so that it may be collected subsequently in the future.

In one embodiment of the invention, data may be transmitted to server 30 in compressed format using commonly available compression and transmission applications. For example, in one embodiment, this may include the use of ADOBE Flash software. Using this approach, the stored interaction data may be converted in to FLASH format (AS3 byte array via ExternalInterface) and compressed using GZIP. This information may then be transmitted to tracking server 30 using an Action Message Format (AMF) request. From a high level, this may be thought of as converting user interaction data into a Flash movie and transmitting it as such to server 30.

In another embodiment of the invention, the transmission of stored user interaction data from web browser module 114 to tracking server 30 may be accomplished using a cross-domain dynamic script request, (which may also be referred to as a cross-site scripting request). This configuration may be used in instances where the compression and transmission technique or application described above is not feasible. Using the cross-domain approach, the executable instructions in tracking script 34 include instructions to periodically request a script file from tracking computer 30, during the user's interaction with the webpage 24. The user's interactions are sent along with the script request. In both of the above transmission cases, should the data fail to be saved, a failure indicator is returned to the requestor and the data will be sent again at a later time.

In executing such instructions, the user interaction data stored during operation 518 while the user browses webpage 24 may be periodically incorporated into a script request, and then transmitted to the tracking server 30 as part of a dynamic script request. According to standardized functionality supported by industry standard web browser applications, exemplified by web browser module 114, such a dynamic script request may be transmitted across domains to the tracking server 30 even though tracking server 30 may typically not be located at the same network domain or site as web server 20. In such a manner, user interaction data captured while browsing webpage 24 received from web server 20 located at a first domain on network 50 may be periodically transmitted cross-domain to tracking server 30 which may be located at a second domain on network 50.

In one embodiment, webpage 24 may include dynamic content which may typically be changed periodically such that if webpage 24 were received from web server 20 at a subsequent time, the content of at least a portion of webpage 24 may have changed. In such an embodiment, one or more portions of webpage 24 which contain dynamic content likely to be changed over time may also be transmitted to tracking server 30 along with cached user interaction data according to processing operation 520. One or more portions of the markup code of webpage 24, such as HTML and/or XML code, corresponding to such periodically changing dynamic content may be transmitted to tracking server 30, while static elements of webpage 24 such as static images or other static content are not transmitted to tracking server 30, in order to reduce the amount of information required to be transferred by dynamic script request. Such information may be obtained by the proxy routines or applications further described herein.

In another embodiment, additional information related to the content and structure of webpage 24 such as a DOM may be transmitted to tracking server 30 along with cached user interaction data as part of operation 520, such as a copy of JavaScript elements of webpage 24, pixel coordinates of one or more on-screen elements of webpage 24, or a list of forms and form fields and their types and attributes, for example.

In an alternative embodiment of the invention directed to tracking a user's interaction with dynamic multimedia applications, such as Adobe Flash™ and Adobe Flex™ applications or movies, processing operation 520 may comprise the web browser transmitting user interaction data to tracking server 30 via an ancillary web browser application such as a Flash™ plug-in, for example. In such an embodiment, transmission of interaction data may be streamed to tracking server 30 in real-time, or may be stored in the web-browser or ancillary application for delayed and/or packetized transmission to tracking server 30. In such an embodiment, the next processing operation may include tracking server 30 storing user interaction data received from the user's web browser, substantially analogous to processing operation 522 as described below.

In the last processing operation 522 of FIG. 5, the tracking server may 30 store user interaction data periodically received from the user's web browser. Processing operation 522 may be implemented using tracking recording module 316 of tracking server computer 30, which may store user interaction data periodically received from the web browser of user computer 10. In one embodiment, such periodically received user interaction data may be persistently and recoverably stored in a tracking storage repository 32, as tracking record 36 (or other data structure), according to any suitable known method, such as through the use of a database, wherein tracking record 36 may be stored in one or more accessible database records, for example.

User interaction data stored as tracking records may alternatively be stored in a separate computer or storage repository which may be accessible by tracking server 30. In embodiments where information in addition to user interaction data, such as dynamic content of webpage 24, or other data relating to the content or structure of webpage 24 are transmitted to tracking server 30, such additional information may also be stored by tracking server 30 in processing operation 522, and may be stored as part of a tracking record 36 which includes user interaction data, or alternatively may be stored in a separate record from such user interaction data.

According to a further embodiment, in a case where a user ends a session of browsing or interacting with webpage 24 before all of the user's interaction with webpage 24 has been captured, processed and transmitted to tracking server 30, tracking script 34 may additionally comprise instructions to save any remaining cached user interaction data in a web browser offline storage memory, and to save information identifying the user browsing session from which the user interaction data was captured. Such browser offline storage memory may be comprised in web browser module 114 of user computer 10, or alternatively, may be comprised elsewhere in memory 110 of user computer 10.

In such an embodiment, tracking script 34 may further comprise instructions to transmit any such remaining user interaction data saved in browser offline storage to tracking server 30 if the user subsequently visits another webpage, and to transmit the information identifying the user browsing session saved with the remaining interaction data, so that the remaining user interaction data may be associated with other interaction data from the same browsing session for storage on the tracking server 30.

In yet another embodiment, user interaction data received by tracking server 30 may be subjected to data analysis and/or processing before or after being stored as tracking record 36. Data analysis may include calculation of certain analytics which may include, but are not limited to: calculating the distance traveled by a user's mouse on webpage 24, calculating completion rate and/or user time spent on a form on webpage 24, calculating the cumulative amount of time a user's mouse spent on various parts of webpage 24, and compiling a visual representation of user interaction with webpage 24, for example. This may further include tracking which portions of the webpage were visible to a user at what times.

Data processing may include, for example, formatting user interaction data for storage and/or compressing user interaction data. In such embodiments, the results of such analysis and/or data processing may be stored as part of or in association with tracking record 36, or alternatively, may be stored separate from tracking record 36. In a particular embodiment, certain statistical reports relating to user interaction may be generated. For example, a heatmap visual representation of user interaction may be created wherein an aggregate of a user's (or multiple users) interaction with webpage 24 are represented graphically as colored regions overlaid on webpage 24, each region corresponding to relative concentrations of users' mouse movements and/or clicks on the underlying portions of the webpage 24, may be compiled from user interaction data received by tracking server 30. Such statistical reports may be user-defined or pre-programmed by a tracking service provider or other third parties.

According to yet a further embodiment, such data analysis and/or data processing may be performed on a computer separate from tracking server 30, such as a processing server, for example, which may be connected to tracking server 30 to send and receive user interaction data, such as by means of network 50.

Figure 6:
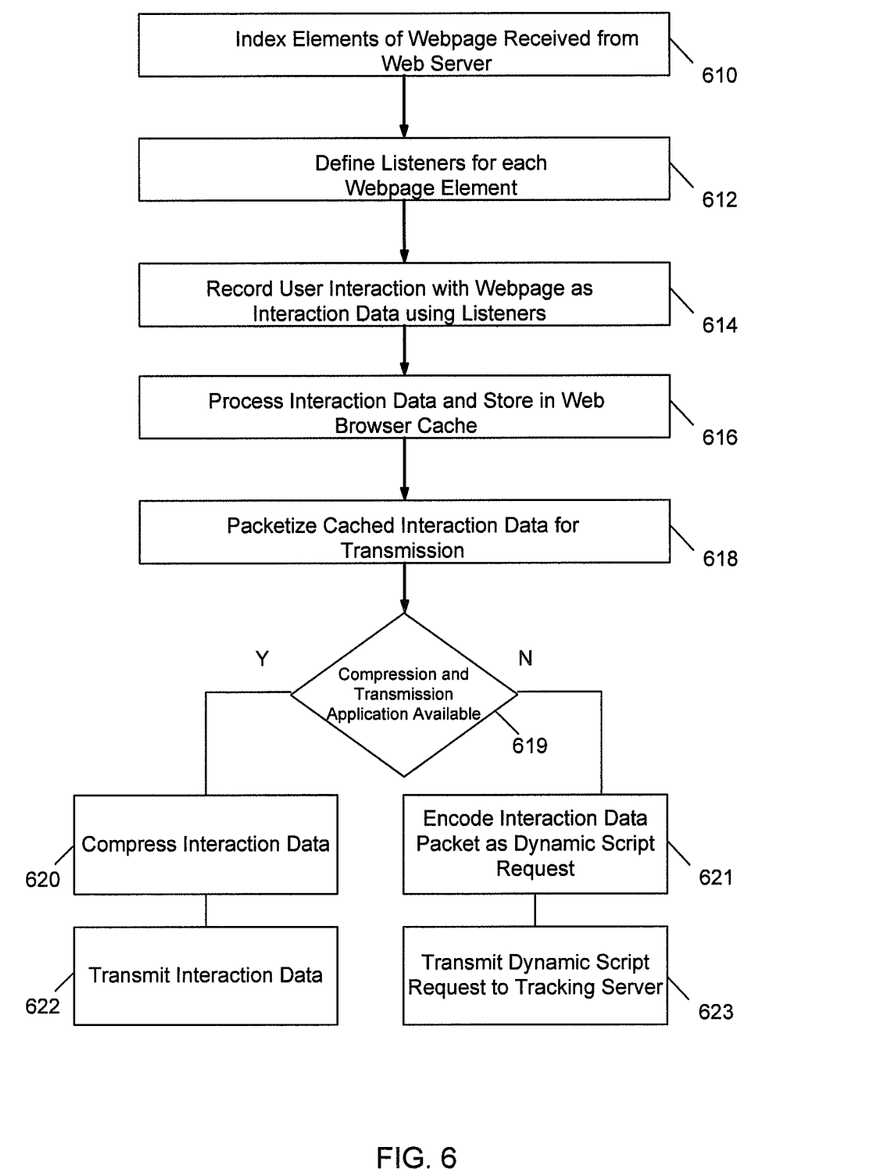
FIG. 6 illustrates a series of processing operations implemented by a user computer associated with an embodiment of the invention.

FIG. 6 illustrates a series of processing operations that may be implemented by web browser module 114 of user computer 10 illustrated in FIG. 2, in accordance with an embodiment of the invention. More particularly, tracking script 34 which may be received by user computer 10 from web server 20 along with or as part of webpage 24, may include instructions which are executable by web browser module 114 to execute the processing operations of FIG. 6. The first processing operation 610 of FIG. 6 indentifies the elements of webpage 24 received from web server 20. In one embodiment, substantially all elements of webpage 24 which are visible to a user browsing the webpage 24 may be indentified as part of operation 610. In another embodiment, a subset of the elements of webpage 24 may be selected for identification according to processing operation 610. Any suitable method known in the art may be used to indentify any relevant elements of webpage 24, such as, but not limited to any suitable known DOM-crawling method, for example. Exemplary website elements which may be indentified according to processing operation 610 may include, but are not limited to: graphics, text, hyperlinks, form fields, SELECT fields, password fields, checkboxes, buttons, tables, embedded static and dynamic objects, and cursor/mouse or other pointer position tracks, for example.

The next processing operation 612 of FIG. 6 is to define listeners or other event based triggers for each webpage element indentified in operation 610 above. In one embodiment of the invention, listeners may be implemented according to any suitable method known in the art for monitoring changes in states and/or values of the indexed elements of website 24 that occur while a user is browsing website 24. In a preferred embodiment, such listeners are implemented according to standard features and/or instruction sets commonly supported by standard web browser applications, such as Internet Explorer® from Microsoft Corporation of Redmond, Wash., and Firefox® from Mozilla Corporation of Mountain View, Calif., Safari™ from Apple Inc. of Cupertino, Calif., and Opera™ from Opera Software of San Diego, Calif., for example.

The next processing operation 614 of FIG. 6 records user interaction with webpage 24 as interaction data, using listeners defined in operation 612 above. In one embodiment of the invention, as a user interacts with webpage 24, such as by browsing or otherwise using webpage 24 displayed on user computer 10, data detected by defined listeners may be recorded as user interaction data by web browser module 114.

Interaction data may be recorded in a buffer within web browser module 114. Such a buffer may be implemented as cookies, DOM storage, or any other suitable buffer configuration known in the art. When interaction data is transmitted to server 30, a response may be sent back to the browser such that only the portion of the interaction data confirmed as received by server 30 is deleted or overwritten. If certain interaction data is not confirmed as properly received, it will be sent again at a later time. This improves the likelihood that substantially all data is properly received at the server, ensuring that any replay of that data will accurately reflect the user's experience.

It will be understood that such interaction data may be recorded on an ongoing basis as user interaction with webpage 24 proceeds over time, and that such interaction data may be recorded in a suitable buffer within web browser module 114 on an ongoing basis. A suitable web browser buffer may allow interaction data to be read from the buffer at the same time as additional interaction data may continue to be recorded to the buffer, as is well known in the art. In an exemplary embodiment, a suitable buffer within web browser module 114 may be implemented by using a JavaScript Array or a JavaScript String, for example.

The next processing operation 616 of FIG. 6 is to process interaction data and store it in web browser storage. In a preferred embodiment, the interaction data previously recorded in a buffer in web browser module 114 during operation 614 may be processed to reduce the total amount of interaction data retained while maintaining a substantially accurate representation of user interaction with website 24, and the resulting retained interaction data may be stored in a memory cache within web browser module 114.

According to one embodiment, interaction data may be processed according to any suitable method or methods known in the art for reducing the amount of interaction data retained while maintaining a substantially accurate representation of user interaction, including, but not limited to: eliminating data relating to redundant events, compressing data relating to substantially similar events (such as by basic run length encoding or other techniques for example), and throttling recurring data such as mouse/cursor/pointer trace location data to a selected data rate, for example. The retained interaction data resulting from such data processing may be stored in a standard web browser cache memory used for storing other types of user browsing-related data and as supported by standard web browser applications known in the art.

The next processing operation 618 of FIG. 6 packetizes stored interaction data for transmission. Stored interaction data may be divided or packaged into one or more interaction data packets using any suitable technique or method known in the art. In one embodiment, stored interaction data stored in a memory cache within web browser module 114 may be divided or packaged into one or more interaction data packets in substantially the order it was recorded during the user's interaction with webpage 24.

For example, such interaction data may be divided into one or more data packets each of a size suitable for transmission as an AMF request. In some embodiments, such data packets may be arranged such that they may be transmitted as streaming content. In yet other embodiments, stored interaction data may be divided or packaged into one or more interaction data packets each of a size suitable for transmission as a dynamic script request by the particular web browser application running on user computer 10.

Next, at step 619, if one or more commonly available data compression and transmission applications are present on computer 10, such interaction data may be compressed at step 620 using those applications. For example, in one embodiment, this may include the use of ADOBE Flash software. Using this approach, the stored and packetized interaction data may be converted in to FLASH format (AS3 byte array via ExternalInterface) and compressed using GZIP. At step 622 this information may then be transmitted to tracking server 30 using an AMF request. In some embodiments, tracking server 30 may be a server using BlazeDS or AMF-PHP.

In other embodiments, where suitable compression and transmission applications are not present on computer 10 at step 619, such stored interaction data may be packaged into one or more interaction data packets, each of a substantially standard size suitable for transmission as a dynamic script request by standard commonly known web browser applications, such as Internet Explorer® from Microsoft Corporation of Redmond, Wash., and Firefox® from Mozilla Corporation of Mountain View, Calif., Safari™ from Apple Inc. of Cupertino, Calif., and Opera™ from Opera Software of San Diego, Calif., for example.

With this alternate approach, processing operation 621 encodes an interaction data packet as a dynamic script request. The interaction data packet may be encoded as a script object by any suitable known encoding means, and a URL identifying tracking server 30 as the location of the script object may be added to define a dynamic script request. In such a manner, the interaction data packet may be incorporated in a dynamic script request to the tracking server 30. The encoding method used to encode the interaction data packet, and the format of the dynamic script request created in operation 621 may preferably be supported by standard web browser applications, and the encoding process is preferably implemented by web browser module 114 running on user computer 10.

The last processing operation 623 of FIG. 6 transmits the dynamic script request to the tracking server 30. The dynamic script request created in operation 620 and incorporating the user interaction data packet may be allowed by standard web browser applications to be transmitted to the tracking server 30 even though tracking server 30 may typically not be located at the same network domain as web server 20 from which webpage 24 was served to the user computer 10. Although the transmission of data by a web browser application across domains would not normally be supported due to Same Origin security policies included in all standard web browser applications known in the art, the transmission of user interaction data by means of a cross-domain dynamic script request allows for the transmission of user interaction data by the web browser application to a tracking server 30 that is not located at the same network domain as the web server 20.

In an alternative embodiment, an interaction data packet may be encoded as a dynamic request for a hidden image file in processing operation 621, rather than a dynamic script request. In such a case, tracking server 30 may be set as the source location or URL for the requested image file. In such an embodiment, processing operation 623 would then comprise transmitting the dynamic image request to the tracking server 30 as a cross-domain dynamic image request.

In a further alternative embodiment of the invention directed to tracking a user's interaction with a webpage 24 and playing back the user's interaction in real-time for display to one or more other users in a collaborative environment, processing operations 618 and 620 may include encoding the user's interaction data as a real-time data stream suitable for transmission to the tracking server 30 using COMET asynchronous data transfer methods, Adobe Flash™ or HTTP "Get" requests.

In such an embodiment, processing operation 622 may comprise transmitting the encoded user interaction data to tracking server 30 in real-time such as by streaming of interaction data using comet methods or Adobe Flash. Upon receipt of the streamed interaction data by tracking server 30, the real-time interaction data may be played back in real-time from the tracking server 30 to one or more other computers, such that the recorded user interaction with webpage 24 is displayed on the other computers, allowing for collaboration. Such embodiment may be particularly suited to applications where one or more collaborative users wish to view the interaction of a single user with webpage 24, such as for assisting the user in completing an operation on the webpage 24 for example, or for collaborative applications where two or more users wish to view each other's interaction with a webpage 24 simultaneously in realtime, such as for collaborating on a game on webpage 24 for example. Optionally, in such embodiment, executable instructions for collaboratively tracking and replaying user interaction with a webpage as described above may be provided or exposed as an application programming interface (API) for integration into existing applications, such as web applications and/or webpages, for example, to provide for the recording, transmission and replay of user interaction data for the purposes of collaboration between two or more users.

Figure 7:
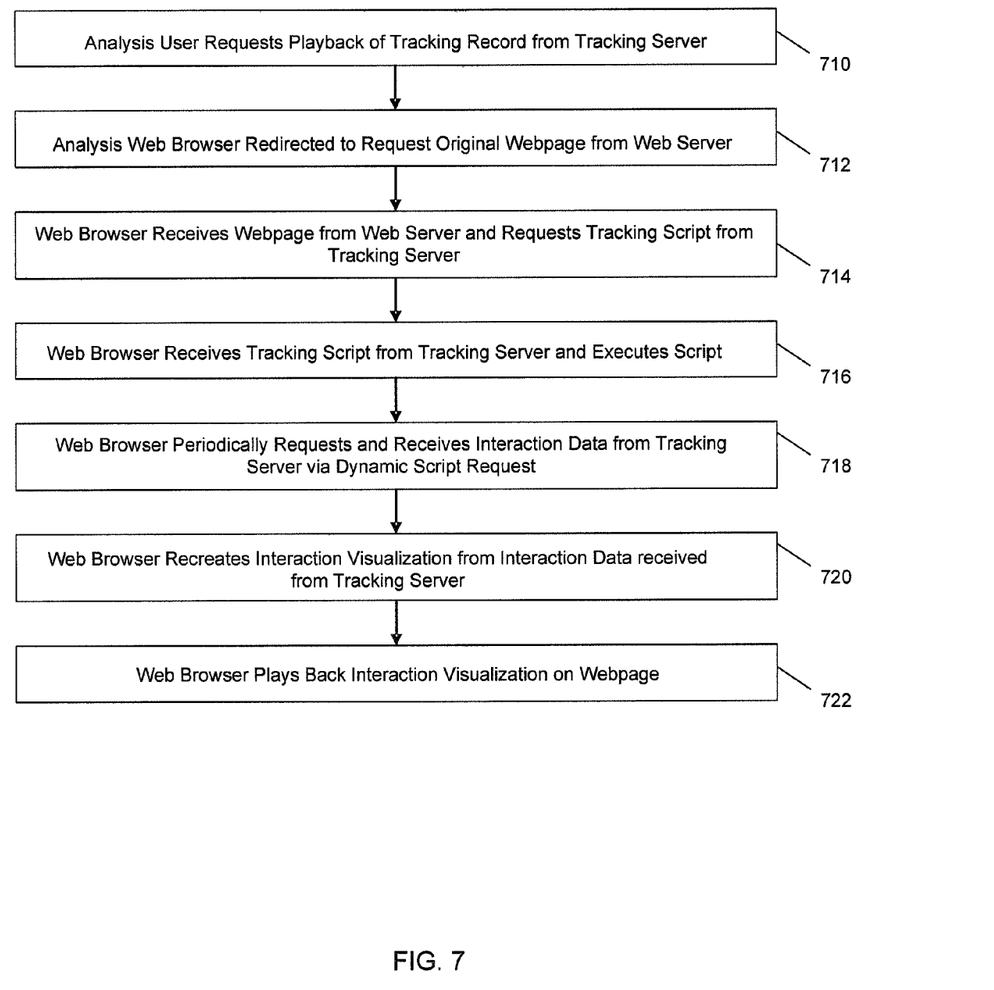
FIG. 7 illustrates a series of processing operations associated with a playback embodiment of the invention.

FIG. 7 illustrates a series of processing operations that may be implemented by the system illustrated in FIG. 1, and the exemplary computers illustrated in FIGS. 2-4, according to an embodiment of the invention. In the first processing operation 710 of FIG. 7, an analysis user requests playback of a tracking record 36 from replay server 30. In one embodiment of the invention, the analysis user requests playback of the tracking record 36 from replay server 30 using a commonly available multimedia player application such as Windows Media Player executing on an analysis computer 40.

In another embodiment of the invention, the analysis user may request playback of the tracking record 36 from replay server 30 using a commonly available web browser application executing on an analysis computer 40 to access a playback webpage served by replay server 30 and selecting tracking record 36 for playback.

Analysis computer 40 may be substantially similarly configured to user computer 10 shown in FIG. 2, and reference to computer 10 may be substituted for analysis computer 40 hereafter. Accordingly, web browser module 114 may be used to implement processing operation 710, and to communicate the request for playback of tracking record 36 to the tracking server 30 by means of network 50, according to known methods. Tracking record 36 may include user interaction data recorded from the interaction of a user while browsing webpage 24, and has been previously transmitted to replay server 30 as described above, and stored as tracking record 36. Tracking record 36 may be stored on any suitable storage medium accessible to replay server 30, such as tracking storage repository 32 for example.

If the tracking record exists in multimedia format, that record may be provided to computer 40 and replayed as such. If tracking record 36 remains as a set of interaction data when the playback request is made, that data may be replayed and converted to a suitable multimedia file format at replay server 30, and then provided to analysis computer 40 after conversion.

For example, this may be accomplished using any known suitable multimedia conversion technique or through a "movie maker" application that is configured to replay tracking record 36 in an embedded browser hosted by replay server 30 as described below in steps 712-722. Screenshots of the browser replaying the interaction data may be captured at selected or predetermined intervals and combined as is known in the art to create a video file. Once converted to a video file, the interaction data may be subsequently stored on replay server 30 in that format so that future conversion is not required. Once in such a video format, the interaction is substantially independent of replay server 30 and may be freely transferred to standard computing devices for further playback or analysis.

In the case where web browser replay is performed, the next processing operation 712 of FIG. 7, the analysis web browser may be redirected to request the original webpage 24 from web server 20 if it is unavailable from tracking server 30. In the next processing operation 714 of FIG. 7, the web browser receives webpage 24 from web server 30 and requests tracking script 34 from replay server 30. Processing operation 714 substantially corresponds to processing operations 512 and 514 as described in greater detail above in reference to FIG. 5. Analysis computer 40 may receive webpage 24 from server 30, and request tracking script 34 from tracking server 30 by means of network 50, according to known methods.

In the next processing operation 716 of FIG. 7, the web browser receives tracking script 34 from tracking server 30, and executes tracking script 34. Processing operation 716 may be implemented by the web browser module 114 running on analysis computer 40. As described above, preferably, all executable instructions comprised in tracking script 34 which are included with webpage 24 as received by the analysis computer 40 may be executed by any standard web browser application running on the user computer 10, such as represented by web browser module 114. Exemplary standard web browser applications may include Internet Explorer® from Microsoft Corporation of Redmond, Wash., and Firefox® from Mozilla Corporation of Mountain View, Calif., Safari™ from Apple Inc. of Cupertino, Calif., and Opera™ from Opera Software of San Diego, Calif., for example. According to an embodiment of the invention, the executable instructions comprised in tracking script 34 may be implemented by a sub-module, such as tracking script module 116, executing within web browser module 114 on analysis computer 40. In one embodiment, when the tracking script 34 is executed by the web browser, a setting stored in the web browser indicating that playback of tracking record 36 has been requested triggers the execution of playback instructions included in tracking script 34.

According to an embodiment of the invention, tracking script 34 comprises executable playback instructions which may be executed by a web browser application for: requesting recorded user interaction data stored in a tracking record 36 from tracking server 30, recreating an interaction visualization of a user's interaction with a webpage from interaction data received from the tracking server 30, and playing back an interaction visualization on an analysis computer 40.

In the next processing operation 718 of FIG. 7, the web browser periodically requests and receives interaction data from tracking server 30 via dynamic script request. Processing operation 718 may be implemented using web browser module 114 on analysis computer 40, which may periodically request and receive interaction data from tracking server 30 by means of a dynamic script request, and may communicate with tracking server 30 over network 50.

According to one embodiment, the request and receipt of interaction data from tracking server 30 by the web browser module 114 on the analysis computer 40 may be accomplished using a using the Adobe Flash application as described above or, alternatively, by cross-domain dynamic script request, which may also be referred to as cross-site scripting request. According to such embodiment, the executable playback instructions comprised in tracking script 34 received with webpage 24 from server 30 and executed by web browser module 114 on the analysis computer 40, comprise instructions to periodically request an interaction data file from tracking computer 30 by means of a dynamic script request, and to receive the interaction data file from tracking server 30 comprising a user's previously recorded interaction with the webpage 24 which was stored in tracking record 36.

According to standardized functionality supported by industry standard web browser applications, exemplified by web browser module 114, such a dynamic script request may typically be allowed to be transmitted across domains to the tracking server 30 and the resulting interaction data received from tracking server 30, even though tracking server 30 may typically not be located at the same network domain or site as web server 20, from which webpage 24 was received by user computer 10.

According to an alternative embodiment, the web browser on analysis computer 40 may use a cross-domain XMLHttpRequest (such as supported for use in AJAX applications for example) to request and receive interaction data from tracking server 30, in implementing processing operation 718. Optionally, any cross-domain AJAX request may also be used to implement processing operation 718.

According to another embodiment, the interaction data requested and received from tracking server 30 according to processing operation 718 may comprise user interaction data substantially as it was received transmitted by a user computer 10 during recording, and substantially as it was stored as tracking record 36.

According to a preferred alternative embodiment, the interaction data requested and received from tracking server 30 according to processing operation 718 may be transformed or otherwise processed by tracking server 30 prior to its receipt by the web browser of analysis computer 40. In such preferred embodiment, tracking server 30 may process user interaction data stored as tracking record 36 prior to its transmission to the web browser of analysis computer 40, in order to improve the quality of playback of the user interaction data on the analysis computer. Such processing may include one or more of: conversion of the format of user interaction data such as for improving transmission or display of user interaction data, and interpolation of discontinuous user interaction data to improve continuity such as using various known methods (such as Bezier Curve interpolation methods) to interpolate mouse/cursor/pointer movement data to improve continuity of movement, for example. In a particular such embodiment, user interaction data stored as tracking record 36 may be processed by tracking server 30 prior to its receipt by analysis computer 40 by converting the user interaction data into JavaScript Object Notation (JSON) format.

It should be noted that according to yet a further embodiment of the invention, tracking server 30 from which interaction data is requested and received during processing operation 718 need not be the same server computer on which interaction data was first recorded when received from a user computer. Optionally, recorded user interaction data may be transferred from a first recording tracking computer, to a second playback tracking server 30, from which such data is requested during processing operation 718.

In the next processing operation 720 of FIG. 7, the web browser recreates an interaction visualization from interaction data received from tracking server 30. Processing operation 720 may be implemented using web browser module 114 on analysis computer 40, which may recreate an interaction visualization from the interaction data according to any suitable known method or technique. In a preferred embodiment, such an interaction visualization comprises a substantially realistically accurate recreation of user interaction events substantially as previously recorded from the original user interacting with webpage 24 at the time of recording. In one embodiment, the recreated interaction visualization may be temporarily stored in a web browser buffer memory, such as in web browser module 114, so that a first portion of the interaction visualization may be read from the buffer at the same time that a second portion of the visualization recreated from subsequent interaction data periodically received by the web browser may be written to the buffer, in order to provide for a continuous visualization stream recreated from periodically received portions of interaction data received from tracking server 30.

In the final processing operation 722 of FIG. 7, the web browser plays back the interaction visualization on webpage 24 recreated from a DOM stored in tracking server 30. Processing operation 722 may also be implemented using web browser module 114 on analysis computer 40, which may play back the interaction visualization on webpage 24 according to any suitable know method or technique. In a preferred embodiment, the interaction visualization is played back on webpage 24 displayed on analysis computer 40 to display the user interaction with webpage 24 substantially exactly as it took place at the time of recording on user computer 10. According to an embodiment, the playback of the user interaction visualization on webpage 24 displayed on analysis computer 40 may provide for features such as pause, rewind and fast forward of the interaction visualization, to allow for detailed analysis of the original user interaction during playback on the analysis computer 40. Such analysis may be used to understand the interaction of users with webpage 24.

An embodiment of the present invention relates to a computer storage product with a computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higherlevel code that are executed by a computer using an interpreter. For example, an embodiment of the invention may be implemented using XML, JavaScript, C, C++, or other scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A computer implemented method for replaying a user's interaction with a webpage, comprising:
    requesting from an analysis computer playback of a tracking record from a replay server;
    receiving a webpage and requesting a tracking code from the replay server;
    receiving and executing the tracking code, wherein executing the tracking code triggers playback instructions that instruct a web browser on the analysis computer to:
        periodically request and receive recorded user interaction data from the replay server;
        normalize the received user interaction data by rewriting an image URL to point to a correct location of the image and by removing or masking document write calls;
        recreate an interaction visualization from the user interaction data; and
        playback the interaction visualization based on data received from the replay server.

2. The computer implemented method of claim 1 wherein recreating an interaction visualization is based on a document object model.

3. The computer implemented method of claim 1 wherein user interaction data is requested using XMLHttpRequest.

4. The computer implemented method of claim 1 wherein receiving a webpage and requesting a tracking code includes receiving and executing a tracking script.

5. The computer implemented method of claim 1 further comprising generating statistical reports based on one or more tracking records.

6. The computer implemented method of claim 1, wherein the interaction visualization from the user interaction data is converted into a video file and played back with a multimedia playback application.

7. The computer implemented method of claim 6 wherein creating the video file further includes recreating the webpage as seen by the user.

8. The computer implemented method of claim 6 wherein the video file is created based on screen shots acquired during replay of user interaction data on the replay server.

9. The computer implemented method of claim 1 further comprising identifying the correct location of the image using a proxy technique implemented by the replay sever.

10. The computer implemented method of claim 9 wherein normalizing further comprises identifying the correct location of the image from the Internet using the proxy technique.

11. The computer implemented method of claim 1 wherein normalizing further comprises rewriting AJAX requests to use custom AJAX class requests rather than native browser HTTP requests.

12. The computer implemented method of claim 1 further comprising setting the replay server as the correct location of the image and transmitting a cross-domain dynamic image request to the replay server.

13. A computer implemented method for replaying a user's interaction with a webpage, the method comprising:
    requesting from an analysis computer playback of a tracking record from a replay server;
    receiving a webpage and requesting a tracking code from the replay server;
    receiving and executing the tracking code, wherein executing the tracking code triggers playback instructions that instruct a web browser on the analysis computer to:
        periodically request and receive recorded user interaction data from the replay server;
        normalize the received user interaction data by rewriting an image URL to point to a correct location of the image and by rewriting AJAX requests to use custom AJAX class requests rather than native browser HTTP requests;
        recreate an interaction visualization from the user interaction data; and
        playback the interaction visualization based on data received from the replay server.

14. The computer implemented method of claim 13 wherein recreating an interaction visualization is based on a document object model.

15. The computer implemented method of claim 13 wherein user interaction data is requested using XMLHttpRequest.

16. The computer implemented method of claim 13 wherein receiving a webpage and requesting a tracking code includes receiving and executing a tracking script.

17. The computer implemented method of claim 13 further comprising generating statistical reports based on one or more tracking records.

18. The computer implemented method of claim 13, wherein the interaction visualization from the user interaction data is converted into a video file and played back with a multimedia playback application.

19. The computer implemented method of claim 18 wherein creating the video file further includes recreating the webpage as seen by the user.

20. The computer implemented method of claim 18 wherein the video file is created based on screen shots acquired during replay of user interaction data on the replay server.

21. The computer implemented method of claim 13 further comprising identifying the correct location of the image using a proxy technique implemented by the replay sever.

22. The computer implemented method of claim 21 further comprising identifying the correct location of the image from the Internet using the proxy technique.

23. The computer implemented method of claim 13 wherein normalizing further comprises removing or masking document write calls.

24. The computer implemented method of claim 13 further comprising setting the replay server as the correct location of the image and transmitting a cross-domain dynamic image request to the replay server.

* * * * *